A. A. KELLOGG.
CAR TRUCK.
APPLICATION FILED NOV. 6, 1908.

918,061.

Patented Apr. 13, 1909.
2 SHEETS—SHEET 1.

WITNESSES
C. K. Davies.
M. E. Moore.

INVENTOR
Albert A. Kellogg
By Wm. J. Moore
Attorney

A. A. KELLOGG.
CAR TRUCK.
APPLICATION FILED NOV. 6, 1908.
918,061.
Patented Apr. 13, 1909.
2 SHEETS—SHEET 2.
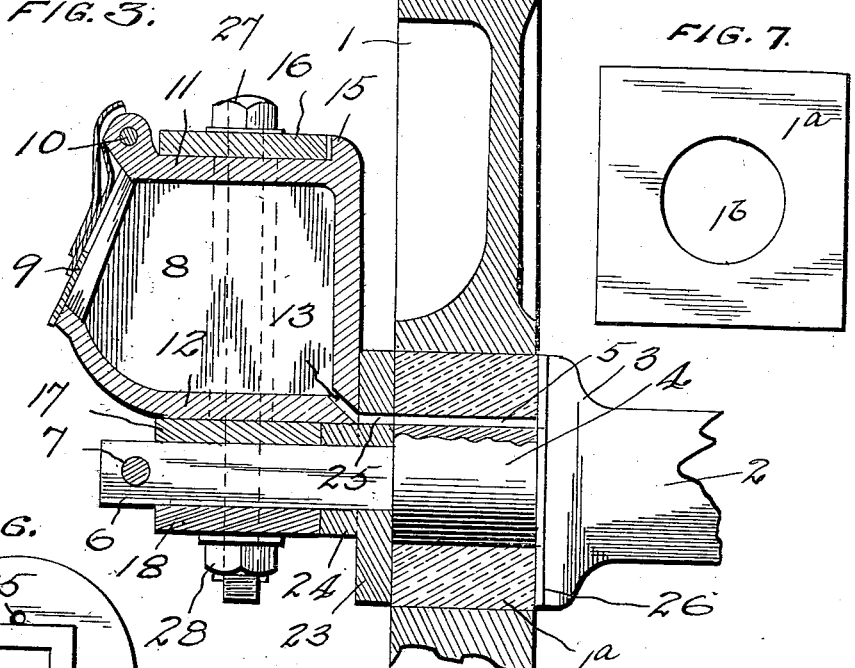
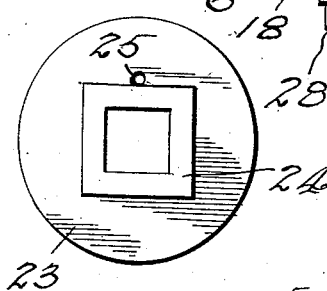
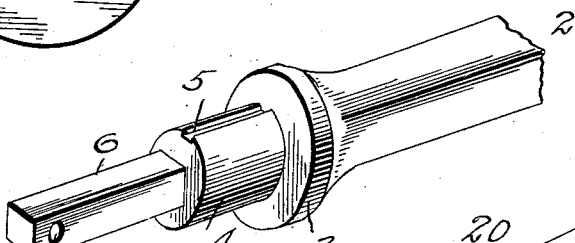
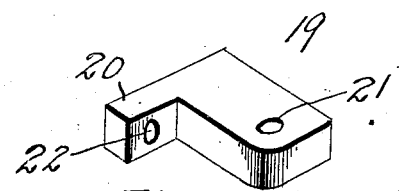
WITNESSES
C. T. Davies
M. E. Moore
INVENTOR
Albert A. Kellogg
By
Attorney

UNITED STATES PATENT OFFICE.

ALBERT A. KELLOGG, OF CLINTON, MISSOURI.

CAR-TRUCK.

No. 918,061.  Specification of Letters Patent.  Patented April 13, 1909.

Application filed November 6, 1908. Serial No. 461,355.

*To all whom it may concern:*

Be it known that I, ALBERT A. KELLOGG, a citizen of the United States, residing at Clinton, in the county of Henry and State of Missouri, have invented certain new and useful Improvements in Car-Trucks, of which the following is a specification.

My present invention relates to improvements in railway car trucks.

The object of the invention is to produce a car truck wherein the axles are stationary and the wheels are journaled thereon in such manner as to be free to revolve thereon and independently of each other. This arrangement of wheels and axles provides a truck of great flexibility, and permits the wheels in traveling to adapt themselves to changing conditions as the truck takes a curve. Further, as generally constructed in trucks where the wheels are rigid with the axles, it has been found in many cases that the wheels on the same axle in a short time assume different diameters because of uneven wear. As a result of this condition, when the truck is running over the road, the larger wheel leads the smaller one on its track and urges the flange of the latter against the head of the rail, wearing the flange and rendering accidents imminent. Again, where there is a difference in size of wheels on a rigid axle, the smaller wheel is caused to slide, with the result that the axle is often twisted, and many times breaks. The provision of trucks wherein the wheels are free to revolve independent of each other on the axle, as in my improved construction, not only obviates the above dangers, but provides a smooth running truck and one which will tend to lengthen the life of the rails of the track on which they run, because of equal distribution of strains.

With these objects in view my invention consists essentially of a railway truck comprising stationary axles with wheels loosely journaled thereon, oil boxes supported on the axles and forming part of the supporting frame, and certain other novel features of construction and combinations and arrangements of parts of a railway truck, as hereinafter pointed out.

In the accompanying drawings I have illustrated one example of the physical embodiment of my invention constructed according to the best mode I have so far devised for the practical application of the principles.

Figure 1:
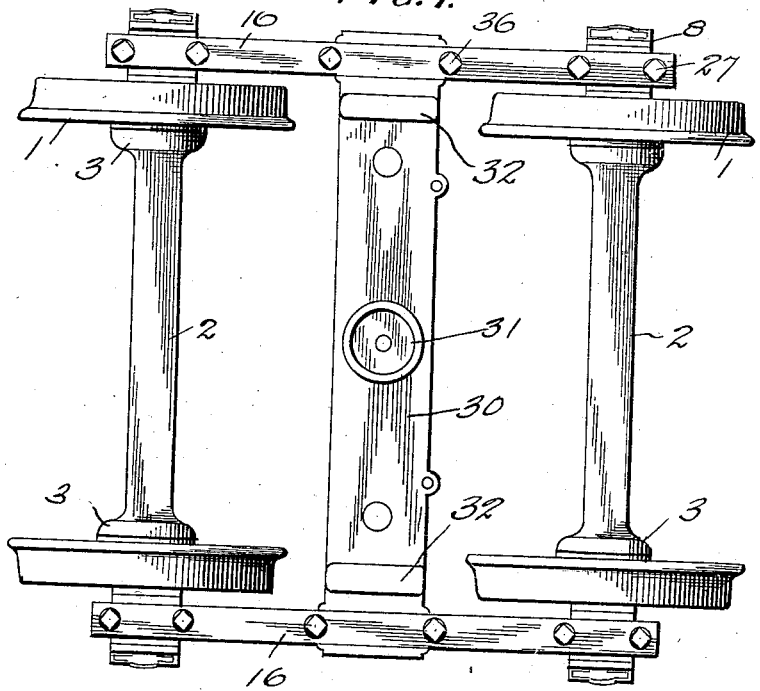
Figure 2:
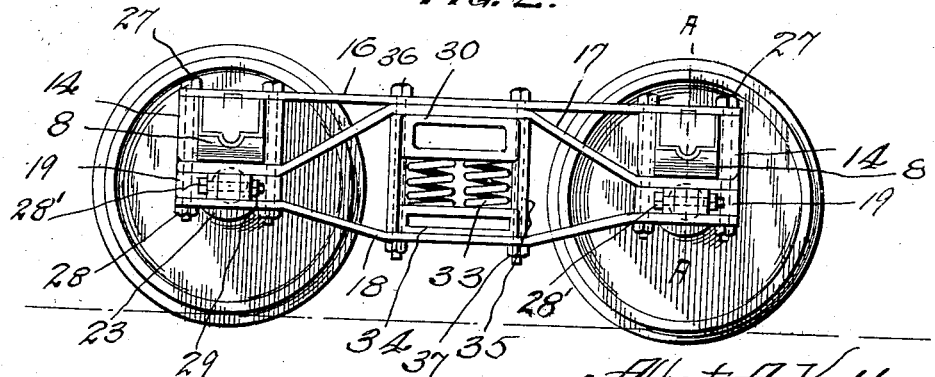

Figure 1 is a plan view of a railway truck embodying the novel features of my invention. Fig. 2 is a side elevation of Fig. 1. Fig. 3 is a broken vertical section on line A—A in Fig. 2. Fig. 4 is a perspective view looking at one end of an axle. Fig. 5 is a similar view of one of a pair of axle brace blocks located at each end of each axle and forming part of the framing. Fig. 6 is a face view of a washer to be interposed between the oil box and the bearing brass of the wheel, and Fig. 7 is a face view of a wheel bearing brass or boxing.

I have illustrated the invention as embodied in a four wheel truck, but it will be understood that a single pair of wheels may constitute a truck, or three pairs of wheels may be employed if desired.

In the exemplified construction of truck, the numerals 1 indicate the wheels of the truck; 1$^a$ a rectangular bearing brass or block, fixed in a complementary seat in the wheel and provided with a journal opening 1$^b$; 2, the stationary axles, preferably rectangular in cross-section as shown; 3, enlarged cylindrical portions or collars formed at opposite ends of the axle proper; 4, the journals of the axles; 5, lubricating channels or oil grooves cut in the upper portion or surface of the journals; 6, an extension, rectangular in cross section, formed at the extreme ends of the axle, and pierced by a hole 7.

The oil box 8 may be of any approved and suitable type and the numeral 9 designates the hinged lid or cover thereof; 10, the hinge; 11, the top wall; 12, the bottom wall; 13, an oil duct leading rearwardly and downwardly from the oil chamber of the box; 14, pedestals formed integrally with and at each side of the box and provided with bolt holes, and 15, a horizontal rib or flange at the rear of the top wall of the box.

The parts of the frame in addition to and in connection with the oil boxes, are designated by the numerals 16 which indicate the arch bars; 17, the inverted arch bars; 18, pedestal tie bars; 19, brace blocks, as a whole; 20 forward extensions or ears thereon; 21, vertical bolt holes, and 22 horizontal bolt holes.

A washer 23 formed with an open projection 24 is interposed between the wheel brass and the oil cup, and provided with an oil passage 25 to establish communication from the oil box to the journal of the axle. A second washer 26 may be interposed between the collar or shoulder 3 of the axle and the wheel brass. These washers not only perform the functions of wearing surfaces, but form effective dust guards for the journal bearing.

The arch bars, tie bars, oil boxes and axles are firmly secured together by the bolts 27 and nuts 28. The axle, brace blocks, and frame bars are further locked by means of the bolts 28' and nuts 29, the bolts passing through the holes in the brace blocks and the holes in the extensions of the axles.

The truck bolster 30 is provided with the usual center plate 31 and side bearings 32, and is supported by means of the bolster springs 33 upon the spring plank 34 and between the transoms 35, the bolts 36 and 37 securing the parts together.

It will be observed that the oil box is carried upon or above the axle extensions and forms a part of the truck side frame. The wheel is held firmly in its position by means of the bolts 27 and 28' which serve to hold the parts of the frame together, and the bolts 28' lock the blocks to the axle and tend to hold the wheel between the oil box and frame at one side of the wheel and the shoulder of the axle at the other side of the wheel.

The oil channel at the upper side of the journal is to be packed with waste or other suitable packing, so that as oil or other lubricant works its way down through the solidly packed box, it will pass along through the groove to the inner side of the wheel, thus oiling the journal throughout its length.

A truck constructed in this manner is easily assembled and taken apart, and does not require the use of special tools. If repairs, or the replacing of parts are necessary, the side frame may be disconnected from the axle and wheels by removing the outer bolt 27 and bolt 28', thus freeing the parts so that the axle may be slipped away from the frame, displacing one of the brace blocks, and in re-assembling, the action is reversed, in simple manner as will be understood.

From the foregoing description taken in connection with the drawings, it is evident that I have produced a railway car truck which fulfils all the conditions set forth as the objects or purposes of my invention.

Having thus fully described my invention, what I claim as new and desire to secure by Letters Patent is:

1. The combination in a railway truck and with the axles thereof, of a side frame comprising oil boxes and arch bars and tie bars, brace blocks interposed in the frame, bolts connecting said brace blocks and the axles, bolts connecting the oil boxes, arch bars, tie bars and brace blocks, and the wheels on said axles revoluble thereon.

2. The combination in a railway truck and with the axles thereof, brace blocks at each side of the axle ends, of a side frame including oil boxes provided with pedestals, arch bars and tie bars and bolts for securing these elements together, and means for connecting the frame with the axles; and revoluble wheels on the axles.

3. The combination in a railway truck and with the stationary axles thereof, of a side frame composed of oil boxes provided with side pedestals, arch bars and tie bars, brace blocks at each side of the axle ends and said members interposed between the ends of the tie bars and one of the arch bars, bolts passed through the arch bars, pedestals, tie bars and brace blocks, and tie bolts passed through the axle and brace blocks; the wheels being revoluble on the axles, as described.

4. The combination in a railway truck and with the stationary axles thereof formed with rectangular extensions at their ends, of a side frame comprising oil boxes, arch bars and tie bars, and brace blocks bolted at each side of said axle extensions; bolts securing the arch bars, oil boxes brace blocks and tie bars together, and the wheels of the truck being revoluble on the journals of the axles.

5. The combination in a railway truck and with the stationary axles thereof formed with journals for wheels loose thereon, and rectangular extensions at the ends of the journals, of a side frame comprising arch bars, tie bars, and brace blocks, the latter bolted at each side of the axle extensions, and bolts securing the parts of the frame together.

6. The combination in a railway truck and with stationary axles formed with journals and said journals provided with an oil channel, brace blocks at each side of the axle ends, of an oil box included within the side frame of the truck and having means of communication with said oil channel; and wheels on the journals.

7. The combination in a railway truck having stationary axles formed with journals and rectangular extensions therefrom, of a side frame comprising an oil box, arch bars and tie bars, brace blocks at each side of said extensions and means for securing these parts together, there being an oil channel in the journal and means for communication between said channel and oil box.

8. The combination in a railway truck having stationary axles and provided with journals, brace blocks at each side of the axle ends, a collar or shoulder formed at one end of the journal and an extension at the other end, a wheel loosely revoluble on the journal, and means comprised within the side frame connected to said extension for holding the wheel on its journal.

9. The combination in a railway truck having stationary axles and provided with journals, a collar or shoulder formed at one end of the journal and a rectangular extension at the other end, a wheel loosely revoluble on the journals, and brace blocks included within the side frame connected to said extension for holding the wheel on its journal.

10. The combination in a railway truck having stationary axles and provided with journals, oil channels in the journals, a collar or shoulder formed at one end of the journal and a rectangular extension at the other end, a wheel loosely revoluble on the journal brace blocks included within the side frame connected to said extension for holding the wheel on its journal, and an oil box also included within the side frame with means for furnishing oil to said oil channel.

In testimony whereof I affix my signature, in presence of two witnesses.

ALBERT A. KELLOGG.

Witnesses:
C. H. SNYDER,
JOHN DRACH, Jr.